United States Patent Office.

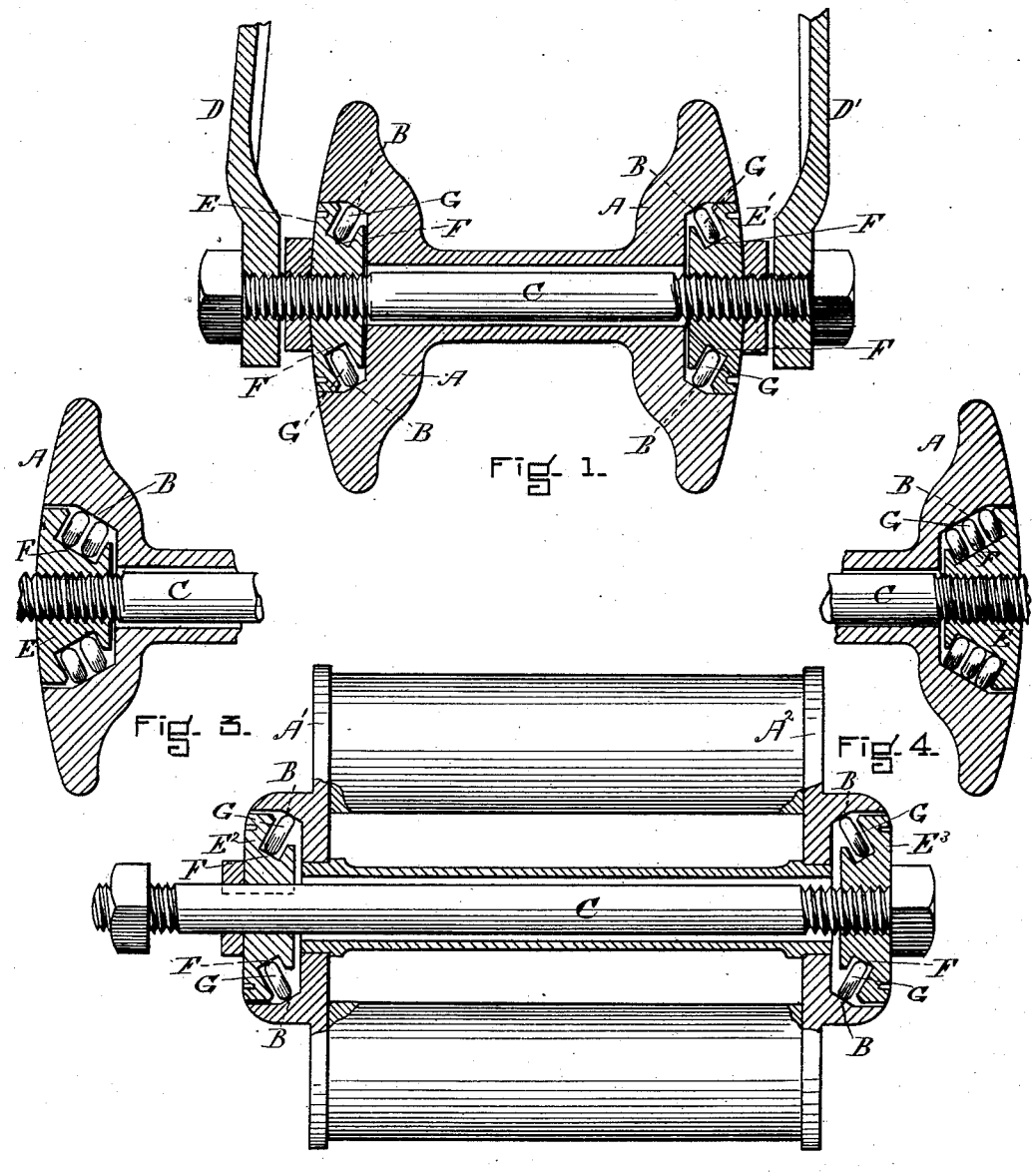
(No Model.) 2 Sheets—Sheet 1.
J. K. STARLEY.
ROLLER BEARING FOR VELOCIPEDES.
No. 353,330. Patented Nov. 30, 1886.

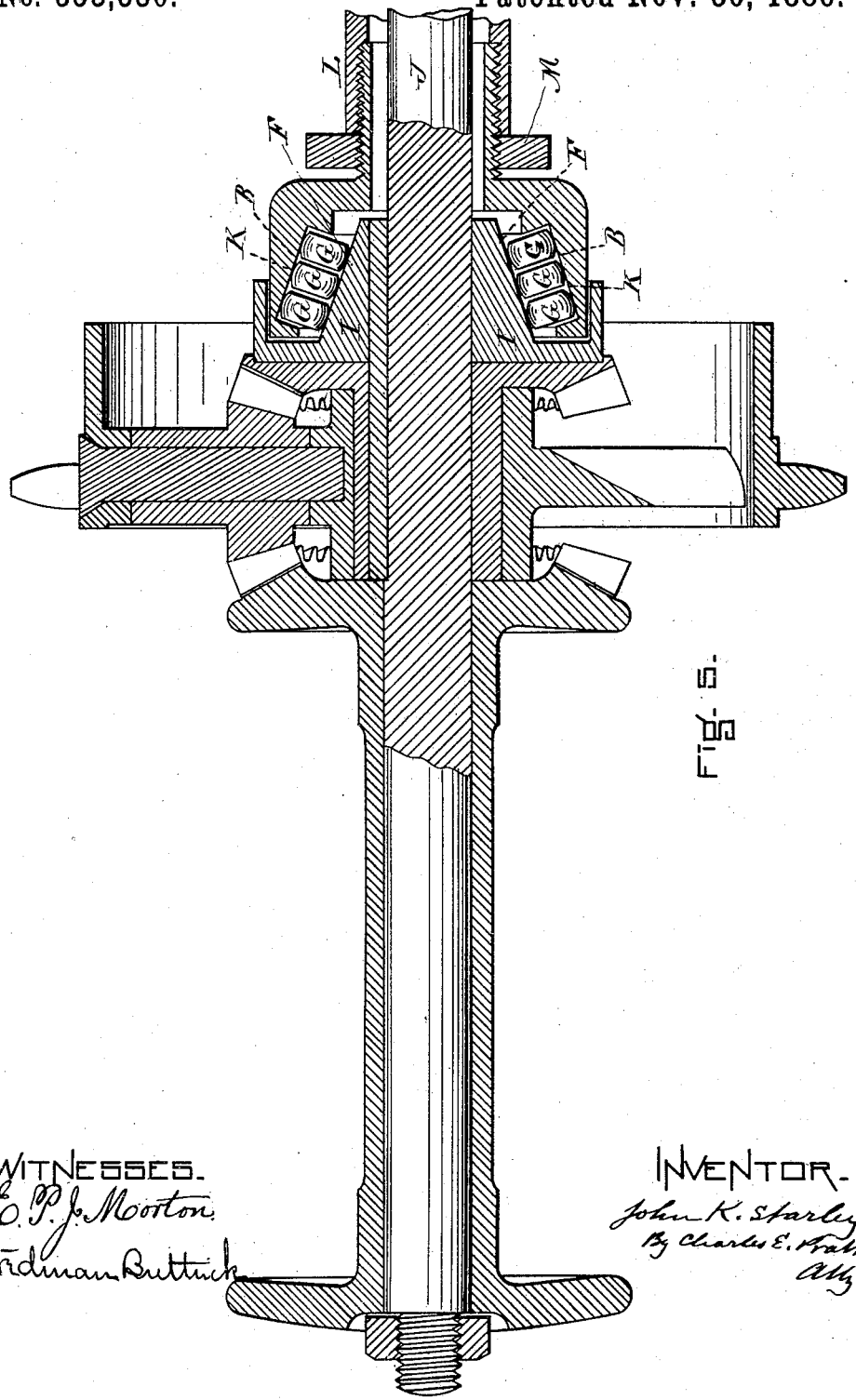

JOHN KEMP STARLEY, OF COVENTRY, COUNTY OF WARWICK, ENGLAND, ASSIGNOR TO THE POPE MANUFACTURING COMPANY, OF HARTFORD, CONNECTICUT.

ROLLER-BEARING FOR VELOCIPEDES.

SPECIFICATION forming part of Letters Patent No. 353,330, dated November 30, 1886.

Application filed December 12, 1885. Serial No. 185,455. (No model.) Patented in England January 30, 1885, No. 1,341.

*To all whom it may concern:*

Be it known that I, JOHN KEMP STARLEY, of the Meteor Works, Coventry, in the county of Warwick, England, velocipede-manufacturer, have invented new and useful Improvements in Roller-Bearings for Velocipedes, Carriages, and like Vehicles or Machines, (for which I have applied for Letters Patent in Great Britain, No. 1,341, dated January 30, 1885,) of which the following is a specification.

Heretofore in my British Patent No. 5,046 of 1880, as well as in my application for Letters Patent of the United States filed August 9, 1886, I have set forth an anti-friction roller-bearing in a form which contained substantially a rectangular cylindrical recess in the hub or bearing-box, a rectangular cylindrical recess in the axle, or between sleeves thereon, said recesses being coaxial with the axle, a cap threaded in the hub or box, a sleeve threaded on the axle, and two rows of roller-disks of prolate spheroidal or similar form, having axes inclined to the axle and alternately placed in the recesses for each side of the wheel; and I have also made improvements upon that construction set forth in my British Patent No. 1,040 of 1885, and also in my application for Letters Patent of the United States filed December 7, 1885, containing substantially curved or rounded bearing-surfaces in or carried by the axle and its box, the radii of which bearing-surfaces are inclined to the axle, and a series of inclined roller-disks rounded or formed upon their peripheries suitably to bear or revolve upon said rounded or curved bearing-surfaces at either side of the bearing, and a screw-sleeve or its equivalent, carrying one of said curved or rounded bearing-surfaces, movable laterally on the axle to change the inclination of the rollers and adjust the bearing, and so forth; and now my present invention is in the line of still further improvements in the same class of bearings, with a view to obtaining greater accuracy and efficiency and less friction in the bearings.

In carrying out this invention in practical form I have still used rollers with axes inclined to the axle, and a collar or sleeve movable laterally on the axle for adjustment, and some other features and connections of similar construction to those in my previous devices; but I have introduced substantial differences in the shape, arrangement, and operation of the bearing-surfaces and of the rollers and grooves and projections with which they are combined, so that the contact between the rollers and the bearing parts in box and on axle is of surfaces having substantially a common tangent parallel with the axes of rotation of the rollers, and that the adjustment is by moving the rollers bodily on inclines, instead of by changing the angle of their inclination, and that the relative positions of the rollers are held in assembling and controlled afterward by certain projections or faces presented at their ends substantially perpendicular to their axes. This will be apparent from the accompanying drawings and description herewith of certain bearings embodying my improvements, in which I use angular or inclined rollers having flattened or slightly-curved peripheries to run on flat angular or plain conical surfaces in the bearing case or hub and on or connected with the shaft or spindle.

For a hub-bearing I form a flat angular groove in a collar on the spindle or shaft, and a flat angular surface on the hub, or vice versa. By setting up these surfaces, by screw or otherwise, the conical annular space in which the rollers run is contracted, thus moving the rollers bodily, instead of altering their angle of inclination.

In the accompanying drawings, Figure 1 is a vertical section of a hub for a bicycle or tricycle back wheel, fitted with bearings constructed in accordance with my invention; Fig. 2, a vertical section of a pedal-bearing so constructed. Figs. 3 and 4 are vertical part sections of hubs, in which, respectively, two and three rows of rollers are used in place of one; Fig. 5, Sheet 2, a section of a long bearing for a sociable or like axle, taken through the balance-gear.

Referring to Fig. 1, A is the hub; B B B B, flat angular or beveled surfaces formed in the same. C is the spindle; D D', the forks supporting it, one end screwing into D and being locked by nut or otherwise, the other passing through fork D', a nut securing the same. On the spindle C are screwed collars E E', having grooves provided with flat angular or beveled surfaces F F F F, formed on the same, or the grooves could be in the hub or corresponding part. G G G G are the rollers, which may be slightly rounded on their peripheries, so as to work on the surfaces B B B B and F F F F, or they may be flat on the peripheries, if desired. To set up the bearing to compensate for wear, or if the same is loose, the collars E E' are screwed up or forced up by other suitable means. This forces the rollers C bodily up the surfaces B B B B on the hub, so adjusting the bearing.

In Fig. 2 the same letters are adopted as far as possible, A' A² being the pedal-plates; B B B B, the surfaces formed thereon; C, the pedal-pin; E² E³, the collars, one being secured or keyed to the pin C, the other screwing up or capable of being forced up, or both so arranged. A lock-nut secures one collar, or if both collars are used lock-nuts secure both.

In Figs. 3 and 4 the same letters apply as in Fig. 1; but more than one row of rollers is used, one set running faster than the next. If a long roller were used, it would appear that one end should run faster than the other, which is impossible; but by making the roller in several parts or disks this is virtually effected. This double, triple, or multiple row of rollers is particularly applicable for use in a "sociable," or other long or heavy bearing, as will be well understood.

In reference to Fig. 5, where a triple row of rollers is shown, I is one collar fixed to the through-axle J of the balance-gear; F, the surface on the same. K is the other collar or case, screwing into the covering or supporting tube L; B, surface on this collar; G G G and G G G, the rollers; M, lock-nut. Setting up the collar K forces the rollers up the inclined surfaces.

The application of my said invention to other vehicles and to light machinery is not shown on the accompanying drawings, but will be well understood.

The roller-disks G may be either rounded or straight on their peripheries, or they may be beveled or V-shaped in section, to run on the plain, straight, conical, or inclined surfaces B and F in the hub A and collar E, and when the rollers are plain cylinders having flat edges I prefer to round or raise the surface B, so as to present a slightly rounded or convex bearing-surface to the rollers. Thus one of the contact-surfaces being rounded and the other straight, there is less friction, and adjustment is effected without changing the inclination of the disks, and with a continuous seat or bearing-surface for contact; but however the shapes of the peripheries and their bearing-surfaces may be modified, the tangents of their lines of contact in cross-section are substantially coincident and parallel with the axis of rotation of the rollers. The grooves in the rollers E, $e'$, $e^2$, $e^3$, or K are substantially rectangular—that is, they are so made as to leave on either side of the bearing track or surface F an annular projection or guide having a face substantially vertical to the axes of the rollers extending along or near to the ends of the rollers, and which serves to hold the rollers in place in assembling the parts and to press the rollers one way or the other in adjusting, and to steady them in action. It is obvious that in applying this invention to the case of an axle fixed in the wheel—as the front wheel of a bicycle—two sets of disks oppositely inclined would be brought nearly together on each side of the wheel or in each bearing, and either with two collars or with one collar and a divided box, one part of which might screw into the other. It is also obvious that in making velocipedes, or the pedals, wheels, or bearings for them, or for other vehicles or purposes, modifications in form and arrangement of the parts may be made without departing from my invention, and I do not mean to be limited to the things herein shown and described except for substance thereof.

I am aware that anti-friction bearings have been heretofore constructed with plain cylindrical rollers, and conical or rounded ended rollers and spherical rollers, wherein the axes of revolution of the rollers were parallel with the axis of the shaft about which they were placed, and that in some of these bearings movable caps or cones have been used as means of adjustment, and that such rollers have been adjusted by moving them toward and from the axle, and I do not claim these things or their combination in a bearing; nor do I here claim one or more series of prolate spheroidal or similarly-shaped roller-disks having inclined axes; nor the combination of bearing-surfaces in box and collar substantially perpendicular to and parallel with the axis of the shaft, one or more of said perpendicular surfaces being adjustable, and one or more series of such inclined rollers in a bearing of this class, because I have claimed these, among other things, in my said application filed August 9, 1886; nor do I claim here curved or rounded bearing-surfaces on or carried by the shaft or axle, and similarly curved or rounded bearing-surfaces in or carried by the hub or box, the radii of said bearing-surfaces being inclined to the axis of the shaft; nor a series of roller-disks having their axes inclined to the axis of the shaft, and rounded or formed upon their peripheries to bear or revolve upon such curved or rounded bearing-surfaces at either side of the bearing; nor an advancing ring or collar bearing, one of said curved or rounded surfaces threaded on the shaft and movable laterally in position, so as to change the inclination of the disks and adjust the bearing; nor the combination of any or all these in a bearing, because I have made them the subject of my said application filed December 7, 1885.

I claim as new and of my invention—

1. The combination, in an anti-friction bearing, of an axle, a hub or box, a bearing-surface, as B, in the hub or box, a series of roller-disks, as G, having inclined axes, a collar, as E, movable laterally and having a bearing-surface, as F, in a substantially rectangular or parallel sided groove, with a projection on either side substantially vertical to the axes of the rollers, and the complementary parts and connections, essentially as set forth.

2. The combination, in an anti-friction bearing, of a series of cylindrical or prolate spheroidal or similarly-shaped rollers having their axes inclined to the axis of the shaft about which they are placed, bearing-surfaces in or carried by the hub or box, and the shaft or axle substantially on conical frustra concentric with the shaft or collar, the lines of contact between the bearing-surfaces and rollers in cross-section being either parallel or one or both convexed to the other, an annular projection or guide on either side of one of said bearing-surfaces substantially vertical to the axes of the rollers, and a means, substantially as described, for changing and securing one of said bearing-surfaces laterally in position, so as to adjust the bearing by moving the rollers along on their bearing-surface without changing their angle of inclination, essentially as set forth.

JOHN KEMP STARLEY.

Witnesses:
W. H. HARRIS,
    *Notary Public, Birmingham.*
F. BAXTER,
    *Birmingham, Notary's Clerk.*